United States Patent
Lin et al.

(10) Patent No.: US 10,538,070 B2
(45) Date of Patent: Jan. 21, 2020

(54) NON-POLYVINYLCHLORIDE SURFACE COVERING

(71) Applicant: Handsome Plastics Co., Ltd., Taipei (TW)

(72) Inventors: Chen-Lung Lin, Taipei (TW); Henn-Sheng Hsia, Taipei (TW); Wan-Hui Lin, Taipei (TW)

(73) Assignee: HANDSOME PLASTICS CO., LTD., Taipei (TW)

( * ) Notice: Subject to any disclaimer, the term of this patent is extended or adjusted under 35 U.S.C. 154(b) by 315 days.

(21) Appl. No.: 15/623,568

(22) Filed: Jun. 15, 2017

(65) Prior Publication Data

US 2018/0281368 A1    Oct. 4, 2018

(30) Foreign Application Priority Data

Mar. 29, 2017 (TW) .............................. 106110478 A

(51) Int. Cl.
*B32B 27/32* (2006.01)
*B32B 5/18* (2006.01)
(Continued)

(52) U.S. Cl.
CPC .............. *B32B 27/32* (2013.01); *B32B 5/022* (2013.01); *B32B 5/18* (2013.01); *B32B 7/12* (2013.01); *B32B 27/065* (2013.01); *B32B 27/08* (2013.01); *B32B 27/12* (2013.01); *B32B 27/18* (2013.01); *B32B 27/20* (2013.01); *B32B 27/22* (2013.01); *B32B 2250/24* (2013.01); *B32B 2250/242* (2013.01); *B32B 2255/10* (2013.01); *B32B 2255/26* (2013.01); *B32B 2255/28* (2013.01);
(Continued)

(58) Field of Classification Search
CPC ......... B32B 27/12; B32B 27/32; B32B 5/022; B32B 2262/101; B32B 2419/04; Y10T 428/24851; Y10T 428/24802; Y10T 428/24868
USPC ........................................................ 428/204
See application file for complete search history.

(56) References Cited

U.S. PATENT DOCUMENTS 9,511,568 B2 * 12/2016 Lin .......................... B32B 7/02
2005/0095412 A1 * 5/2005 Sakaguchi ................ B32B 5/30
428/213
(Continued)

FOREIGN PATENT DOCUMENTS

GB        2522526 A    7/2015

OTHER PUBLICATIONS

European Search Report dated Nov. 10, 2017, issued in application No. 17176700.7-1377.
(Continued)

*Primary Examiner* — Betelhem Shewareged
(74) *Attorney, Agent, or Firm* — McClure, Qualey & Rodack, LLP

(57) ABSTRACT

A non-polyvinylchloride (non-PVC) surface covering is provided. The non-PVC surface covering includes a bottom material layer. A middle layer is disposed on the bottom material layer, wherein the middle layer includes a middle material layer. A transparent abrasion-resistant layer is disposed on the middle layer, wherein the transparent abrasion-resistant layer includes a polyolefin of 40~94.95 wt %, a polyolefin elastomer (POE) or a polyolefin plastomer (POP) of 5~50 wt %, and a processing agent of 0.05~10 wt %.

16 Claims, 2 Drawing Sheets

(51) Int. Cl.

| | | |
|---|---|---|
| *B32B 5/02* | (2006.01) | |
| *B32B 7/12* | (2006.01) | |
| *B32B 27/06* | (2006.01) | |
| *B32B 27/12* | (2006.01) | |
| *B32B 27/18* | (2006.01) | |
| *B32B 27/20* | (2006.01) | |
| *B32B 27/22* | (2006.01) | |
| *B32B 27/08* | (2006.01) | |

(52) U.S. Cl.
CPC ..... *B32B 2262/101* (2013.01); *B32B 2264/06* (2013.01); *B32B 2264/067* (2013.01); *B32B 2264/102* (2013.01); *B32B 2264/104* (2013.01); *B32B 2270/00* (2013.01); *B32B 2274/00* (2013.01); *B32B 2307/102* (2013.01); *B32B 2307/4023* (2013.01); *B32B 2307/412* (2013.01); *B32B 2307/554* (2013.01); *B32B 2307/584* (2013.01); *B32B 2307/7145* (2013.01); *B32B 2307/734* (2013.01); *B32B 2307/744* (2013.01); *B32B 2451/00* (2013.01); *B32B 2471/00* (2013.01); *B32B 2607/02* (2013.01)

(56) References Cited

U.S. PATENT DOCUMENTS

| | | |
|---|---|---|
| 2015/0064434 A1 | 3/2015 | Bastin et al. |
| 2015/0267043 A1 | 9/2015 | Bastin et al. |
| 2016/0263871 A1* | 9/2016 | Lin ............................ B32B 7/02 |
| 2018/0281368 A1* | 10/2018 | Lin ........................ B32B 27/065 |

OTHER PUBLICATIONS

Chinese language office action dated Dec. 4, 2017, issued in application No. TW 106110478.

\* cited by examiner

NON-POLYVINYLCHLORIDE SURFACE COVERING

CROSS REFERENCE TO RELATED APPLICATIONS

The present application is based on, and claims priority from, Taiwan Application Serial Number 106110478, filed on Mar. 29, 2017, the disclosure of which is hereby incorporated by reference herein in its entirety.

BACKGROUND OF THE INVENTION

Field of the Invention

The present invention relates to a surface covering, and in particular it relates to an environmentally friendly non-polyvinylchloride (non-PVC) surface covering with a low amount of deformation amount.

Description of the Related Art

The term "surface coverings" broadly refers to floor coverings or wall decoration materials, which can be roughly divided into single-layer structures and multi-layer structures. However, surface coverings with a single-layer structure, such as wallpaper, do not provide protection for the printing ink. Therefore, most surface coverings have a multi-layer structure. The multi-layer structure includes an abrasion-resistant layer disposed on the printing ink to provide protection. For surface coverings with a multi-layer structure, the dimensional stability of the product and the deformation amount—which is a term that refers to the amount of warping, arching, etc.—have become the criteria for evaluating quality. In addition, because PVC has advantages such as good processing properties, excellent flame retardant properties, and good mechanical properties, as well as low prices, most surface coverings are traditionally made of PVC.

Take PVC plastic floor as example: it is composed of three layers including the abrasion-resistant layer, the middle layer, and the bottom material layer. All of these three layers include PVC, a plasticizer, and a stabilizer. The middle layer and the bottom material layer further include inorganic fillers. Generally speaking, the multi-layer structure is composited together by hot pressing lamination. However, because the structure of each layer has a different thermal contraction, unbalanced contraction occurs during the hot pressing process and leads to a deformation of the resulting multi-layer structure, such as warping or arching.

In order to balance the contraction amount of each layer in the multi-layer structure, several methods for improvement have been developed. So far, the method used to conquer the deformation problem of the multi-layer structure is to improve the bottom material layer. The abrasion-resistant layer composed of PVC generally has a large contraction amount. Therefore, the thickness of the bottom material layer is increased or the amount of PVC in the bottom material layer is enhanced to narrow the difference between the amount of contraction experienced by the bottom material layer and that of the abrasion-resistant layer. This way, the dimensional stability of the product can be better maintained. In addition, because of the toxic gas that can result from incomplete combustion, as well as the environmental problems that are caused by the added plasticizers and the heavy metal hazard of the stabilizers, people have concerns about the safety of PVC products.

In addition, although ionic polymers and copolyesters have been used as a substitute material for PVC in previous studies, they have difficulty being accepted on the market due to their high price. Also, because the crystal contraction caused by heat in the intermolecular hydrogen bonding of the ionic polymers is a process that is progressing slowly, it also renders a poor dimensional stability to the product.

Thus, an environmentally friendly surface covering with excellent dimensional stability and a low amount of deformation is desirable.

BRIEF SUMMARY OF THE INVENTION

According to an embodiment, the present invention provides a non-polyvinylchloride (non-PVC) surface covering. The non-PVC surface covering includes a bottom material layer. A middle layer is disposed on the bottom material layer, wherein the middle layer includes a middle material layer. A transparent abrasion-resistant layer is disposed on the middle layer, wherein the transparent abrasion-resistant layer includes a polyolefin of 40~94.95 wt %, a polyolefin elastomer (POE) or a polyolefin plastomer (POP) of 5~50 wt %, and a processing agent of 0.05~10 wt %.

A detailed description is given in the following embodiments with reference to the accompanying drawings.

BRIEF DESCRIPTION OF THE DRAWINGS

Aspects of the present invention are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1:
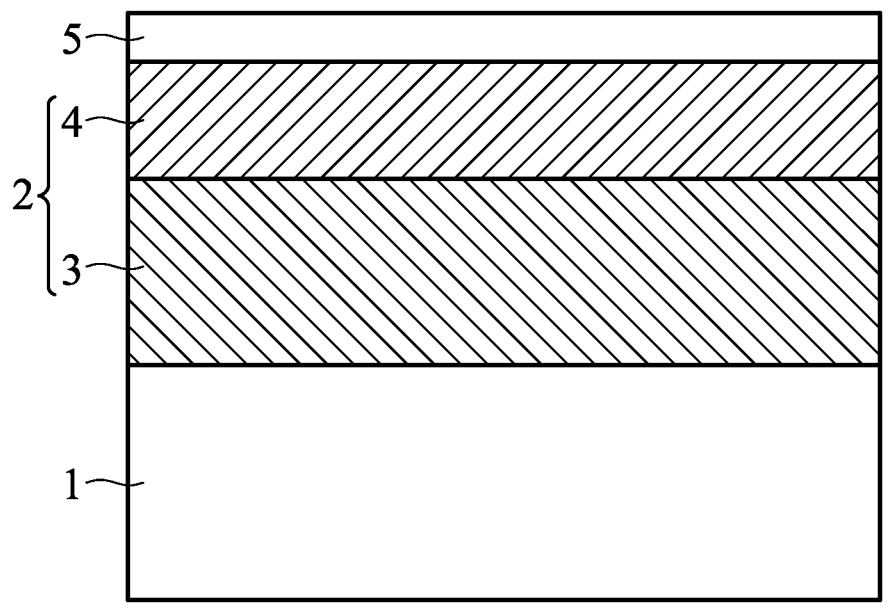
FIG. 1 is a cross-sectional view of a non-polyvinylchloride (non-PVC) surface covering in accordance with one embodiment of the present invention.

The following description is of the best-contemplated mode of carrying out the disclosure. This description is made for the purpose of illustrating the general principles of the disclosure and should not be taken in a limiting sense. The scope of the disclosure is best determined by reference to the appended claims.

The following provides many different embodiments according to different features of the present invention. In the present invention, specific components and arrangements are described for simplicity. However, the present invention is not limited to these embodiments. For example, the formation of a first component on a second component in the description may include embodiments in which the first and second components are formed in direct contact, and may also include embodiments in which additional components may be formed between the first and second components, such that the first and second components may not be in direct contact. In addition, for the purpose of simplicity and clarity, the present disclosure may repeat reference numerals and/or letters in the various examples.

However, it does not in itself dictate a specific relationship between the various embodiments and/or configurations discussed.

Embodiments of the present invention provide an environmentally friendly non-polyvinylchloride (non-PVC) surface covering, which has an excellent dimensional stability and a low deformation amount. In addition, compared to PVC surface coverings, the non-PVC surface coverings provided by the present invention have a better abrasion resistance.

Specifically, in the present invention, by improving the composition of the transparent abrasion-resistant layer, the transparent abrasion-resistant layer and the bottom material layer can have a similar thermal contraction amount at a low cost condition, such that the average deformation (warping or arching) amount of surface covering is significant reduced, forming a symmetrically balanced structure and improving the abrasion resistance of the surface covering.

FIG. 1 is a cross-sectional view of the non-PVC surface covering 10 in accordance with an embodiment of the present invention. As shown in FIG. 1, one embodiment of the present invention provides a non-PVC surface covering 10, including a bottom material layer 1, a middle layer 2 disposed on the bottom material layer 1, and a transparent abrasion-resistant layer 5 disposed on the middle layer 2.

In one embodiment, the bottom material layer 1 may include a polyolefin, a processing agent, and an organic or inorganic filler. In the bottom material layer 1, the organic or inorganic filler may be present in the amount of 65 wt % or more. The thickness of the bottom material layer 1 may be between 0.5 and 6 mm. For example, the thickness of the bottom material layer 1 may be between 0.5 and 2 mm.

In one embodiment, the middle layer 2 may include a middle material layer 3, and a printing layer 4 disposed on the middle material layer 3, as shown in FIG. 1. In another embodiment, the printing layer 4 in the middle layer 2 may be omitted. In such cases, the middle layer 2 is the middle material layer 3. The middle material layer 3 may include a polyolefin, a processing agent, and an organic or inorganic filler. In the middle material layer 3, the organic or inorganic filler may be present in the amount of 75 wt % or more. It should be noted that, without affecting the symmetrically balanced structure, as long as the middle layer 2 is capable of being made into a sheet material, the more organic or inorganic filler in the middle layer 2, the better. The thickness of the middle layer 2 may be between 0.5 and 6 mm. For example, the thickness of the middle layer 2 may be between 0.5 and 2 mm. The printing layer 4 may include a polyolefin, a processing agent, and an organic or inorganic filler. The printing layer 4 may have patterns such as wood grain, stone grain or different colors by printing ink. The thickness of the printing layer 4 may be between 0.05 and 0.25 mm. For example, the thickness of the printing layer 4 may be between 0.05 and 0.1 mm.

In one embodiment, the transparent abrasion-resistant layer 5 may include a polyolefin of 40~94.95 wt %, a polyolefin elastomer (POE) or a polyolefin plastomer (POP) of 5~50 wt %, and a processing agent of 0.05~10 wt %. In one embodiment, the thickness of the transparent abrasion-resistant layer 5 may be between 0.05 and 10 mm. For example, the thickness of the transparent abrasion-resistant layer 5 may be between 0.1 and 1.2 mm. The transparent abrasion-resistant layer 5 may further include a small amount of other functional materials, such as scratch resistant materials, matte materials, slip-resistant materials, antibacterial materials, or a combination thereof, to provide functions such as scratch-resistance, matting property, slip-resistance, and antibacterial property.

The polyolefins used in the bottom material layer 1, the middle material 3, and the transparent abrasion-resistant layer 5 may be the same or they may be different.

In some embodiments, the polyolefin may include polyethylene (PE), polypropylene (PP), polybutene (PB), etc. As long as the polyolefins used in the bottom material layer 1, the middle layer 2, and the transparent abrasion-resistant layer 5 are compatible with each other, these polyolefins can be used in the present invention. When using compatible materials in the three-layer structure, the materials may be recycled and remanufactured during the middle of the manufacturing process to avoid any waste of materials. In one embodiment, the polyolefin used in at least one layer of the bottom material layer 1, the middle layer 2, and the transparent abrasion-resistant layer 5 is polypropylene. In another embodiment, all of the polyolefins used in the bottom material layer 1, the middle layer 2, and the transparent abrasion-resistant layer 5 are polypropylene. Although the processibility of polypropylene is different from that of PVC, polypropylene has advantages such as being non-toxic when burned, having no plasticizer, and not being a heavy metal hazard.

In some embodiments, each of the POE and the POP independently includes a copolymer of at least one polyolefin selected from the group consisting of a copolymer of octene, a copolymer of hexene, a copolymer of butene, a copolymer of propylene, and a copolymer of ethylene. The POE may include Vistamaxx 6102 (ExxonMobil), Engage 7467 (DOW), Engage 8842 (DOW), or Tafmer PN2070 (MITSUI). The POP may include Exact 9182 (ExxonMobil). It should be realized that, as long as the POE or the POP is compatible with the polyolefin added in the present invention, they can be used in the present invention and they are not limited to the POE and the POP described above.

Because the surface covering provided by the present invention has a multi-layer structure, good symmetrical contraction between the transparent abrasion-resistant layer and the bottom material layer is required to provide the surface covering with a good dimensional stability and a low amount of deformation (warping or arching). Instead of changing the thickness and composition of the bottom material layer as known in the art, the present invention improves the composition of the transparent abrasion-resistant layer to reduce the thermal contraction amount of transparent abrasion-resistant layer. Specifically, the present invention introduces POE or POP as the composition of the transparent abrasion-resistant layer. Because POE and POP do not produce crystal contraction easily and because of their characteristics such as transparency, elasticity, and flexibility, the contraction amount can be reduced after mixing POE or POP with polyolefin.

It should be noted that, as the contraction amount of the transparent abrasion-resistant layer reduces, the contraction amount of bottom material layer may be reduced to obtain the required symmetrically balanced structure. In other words, in the present invention, unlike the prior art, increasing the thickness of the bottom material layer or enhancing the amount of polyolefin (such as traditionally used PVC) in the bottom material layer is not needed in order to act in concert with the high contraction amount of abrasion-resistant layer. In the present invention, the reduced amount of polyolefin in the transparent abrasion-resistant layer is replaced by POE or POP. As a result, not only can a good contraction balance be obtained between the transparent abrasion-resistant layer and the bottom material layer, but also the cost can be reduced. In addition, there is no need to add too much polyolefin in the bottom material layer, and therefore, the amount of organic or inorganic filler in the bottom material layer can be increased, and the cost can be reduced accordingly.

However, it should be noted that POE and POP are soft materials. Too much POE or POP, for example, more than 50 wt %, may reduce the abrasion resistance of the transparent abrasion-resistant layer, causing it to lose functionality. With too little POE or POP, for example, less than 5 wt %, the thermal contraction amount of transparent abrasion-resistant layer is still too large. In such cases, it is difficult for the transparent abrasion-resistant layer to reach a balance with the bottom material layer, thus increasing the contraction amount of warping of the whole surface covering. Therefore, in the embodiments of the present invention, the amount of POE or POP is 5~50 wt % of the weight of the transparent abrasion-resistant layer. For example, the amount of POE or POP is 10~40 wt % or 15~35 wt % of the weight of the transparent abrasion-resistant layer.

The processing agents used in the bottom material layer 1, the middle material layer 3, and the transparent abrasion-resistant layer 5 may be the same or they may be different. In one embodiment, the amount of processing agent in the bottom material layer 1 is 0.05~10 wt % of the weight of the bottom material layer 1. In another embodiment, the amount of processing agent in the middle material layer 3 is 0.05~10 wt % of the weight of the middle material layer 3.

In some embodiments, the processing agent may include an antioxidant, a dispersant, an antistatic agent, a coupling agent, an UV absorber, a light stabilizer, a flame retardant, a lubricant, or a nucleating agent. The antioxidant may be Tinuvin 326 (Ciba). The dispersant may be METABLEN P530A. The antistatic agent may be tri-n-butylmethylammonium bis-(trifluoromethanesulfonyl)imide. The coupling agent may be Dow Corning® Z6040. The UV absorber may be Eversorb® 73. The light stabilizer may be Uvinul 4077 H (BASF). The flame retardant may be GY-FR-OP31(GYC) or UTFR-POC-3(UNITETEK). The lubricant may be zinc stearate or calcium stearate. The nucleating agent may be 1,3:2,4-bis(3,4-dimethylobenzylideno)sorbitol.

In some embodiments, the organic filler may include sugar, starch, or wood flour. In some embodiments, the inorganic filler may include calcium carbonate, magnesium carbonate, talcum powder, silicon oxide, silicon carbide, glass fiber, titanium dioxide, or alumina.

Figure 2:
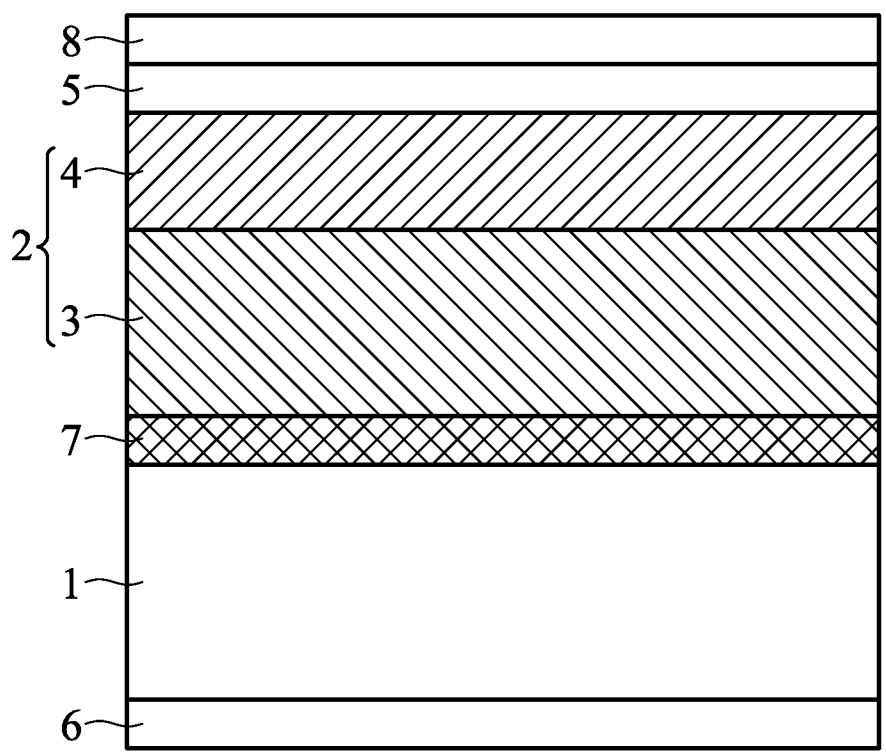
FIG. 2 is a cross-sectional view of a non-PVC surface covering in accordance with another embodiment of the present invention.

In addition, other functional layers may be added to the non-PVC surface covering of the present invention according to demand. FIG. 2 is a cross-sectional view of a non-PVC surface covering 20 in accordance with another embodiment of the present invention. As shown in FIG. 2, one embodiment of the present invention provides a non-PVC surface covering 20. It is different from the non-PVC surface covering 10 shown in FIG. 1 in that the non-PVC surface covering 20 further includes a functional layer 6 disposed at the bottom surface of the bottom material layer 1. In some embodiments, the functional layer 6 may include a foam layer, a nonwoven layer, an adhesive layer, or a combination thereof. The foam layer may provide a silencing and muting effect. The nonwoven layer may enhance the amount of glue absorption to increase the adhesion ability with the contact surfaces. The adhesive layer may provide the non-PVC surface covering 20 with a slip-resistant effect.

Compared to the non-PVC surface covering 10, the non-PVC surface covering 20 further includes a glass fiber layer 7 disposed between the bottom material layer 1 and the middle layer 2, which may further enhance the dimensional stability of the non-PVC surface covering 20.

Compared to the non-PVC surface covering 10, the non-PVC surface covering 20 further includes a coating layer 8 disposed on the transparent abrasion-resistant layer 5. The coating layer 8 may include a scratch resistant coating, a matte coating, a slip-resistant coating, an antibacterial coating, or a combination thereof to provide functions such as scratch-resistance, matting properties, slip-resistance, and antibacterial properties.

It should be realized that, in the non-PVC surface covering 20 shown in FIG. 2, the additionally disposed functional layer 6, glass fiber layer 7, and coating layer 8 are merely one of numerous embodiments of the present invention. The present invention is not limited herein.

Those skilled in the art may make various changes, substitutions, and alterations herein in accordance with the teaching of the present invention and the current technique without departing from the spirit and scope of the present disclosure.

Embodiments of the present invention provide an environmentally friendly non-PVC surface covering, which has an excellent dimensional stability and a low deformation amount. Compared to PVC surface covering, the non-PVC surface covering provided by the present invention has better abrasion resistance. In addition, the non-PVC surface covering provided by the present invention may be used in different applications by adding other functional layers.

The various Embodiments and Comparative Examples are listed below to illustrate the manufacturing methods of the surface coverings provided by the present invention and the characteristics thereof.

Example 1

25 kg of polypropylene, 73 kg of calcium carbonate, and 2 kg of calcium stearate were blended to form a bottom material layer with a thickness of 1.2 mm. 20 kg of polypropylene, 78 kg of calcium carbonate, and 2 kg of calcium stearate were blended to form a middle material layer with a thickness of 1.3 mm. 70 kg of polypropylene, 29.5 kg of polyolefin plastomer Exact 9182 (ExxonMobil), and 0.5 kg of antioxidant Tinuvin 326 (Ciba) were blended to form a transparent abrasion-resistant layer with a thickness of 0.5 mm. The aforementioned bottom material layer, middle material layer, and transparent abrasion-resistant layer were sequentially stacked together from bottom to top, and then a hot pressing process was performed at 140° C. and 70 kg/cm$^2$ for 35 minutes. After molding, it was cut into a square with a side length of 9.5 inches and was oven-dried at 80° C. for 6 hours.

The four right angles were measured before and after the oven-drying process at 80° C. for 6 hours. The average warping (deformation) amount was 0.3 mm and the dimensional change was 0.04%. In addition, a wear-resistance testing was performed according to the test method defined in ASTM D4060-10 ("Standard Test Method for Abrasion Resistance of Organic Coating by Taber Abraser"). After 1500 turns using S42 sandpaper, the weight loss was 166 mg.

Example 2

30 kg of polypropylene, 68 kg of calcium carbonate, and 2 kg of calcium stearate were blended to form a bottom material layer with a thickness of 1.2 mm. 20 kg of polypropylene, 78 kg of calcium carbonate, and 2 kg of calcium stearate were blended to form a middle material layer with a thickness of 1.3 mm. A polypropylene (PP) layer made by South Asia Plastics Industry Co., Ltd with a thickness of 0.07 mm was used as a printing layer. 85 kg of polypropylene, 14.5 kg of polyolefin plastomer Exact 9182 (ExxonMobil), and 0.5 kg of antioxidant Tinuvin 326 (Ciba) were blended to form a transparent abrasion-resistant layer with a thickness of 0.5 mm. The aforementioned bottom material layer, middle material layer, printing layer, and transparent abrasion-resistant layer were sequentially stacked together from bottom to top, and then a hot pressing process was performed at 140° C. and 70 kg/cm$^2$ for 35 minutes. The middle material and the printing layer formed a middle layer. After molding, it was cut into a square with a side length of 9.5 inches and was oven-dried at 80° C. for 6 hours.

The four right angles were measured before and after the oven-drying process at 80° C. for 6 hours. The average warping (deformation) amount was 0.2 mm and the dimension change was 0.03%. In addition, a wear-resistance testing was performed according to the test method defined in ASTM D4060-10 ("Standard Test Method for Abrasion Resistance of Organic Coating by Taber Abraser"). After 1500 turns using S42 sandpaper, the weight loss was 183 mg.

Example 3

30 kg of polypropylene, 68 kg of calcium carbonate, and 2 kg of calcium stearate were blended to form a bottom material layer with a thickness of 1.2 mm. 20 kg of polypropylene, 78 kg of calcium carbonate, and 2 kg of calcium stearate were blended to form a middle material layer with a thickness of 1.3 mm. A polypropylene (PP) layer made by South Asia Plastics Industry Co., Ltd with a thickness of 0.07 mm was used as a printing layer. 80 kg of polypropylene, 19.5 kg of polyolefin plastomer Exact 9182 (ExxonMobil), and 0.5 kg of antioxidant Tinuvin 326 (Ciba) were blended to form a transparent abrasion-resistant layer with a thickness of 0.5 mm. The aforementioned bottom material layer, middle material layer, printing layer, and transparent abrasion-resistant layer were sequentially stacked together from bottom to top, and then a hot pressing process was performed at 140° C. and 70 kg/cm$^2$ for 35 minutes. The middle material and the printing layer formed a middle layer. After molding, it was cut into a square with a side length of 9.5 inches and was oven-dried at 80° C. for 6 hours.

The four right angles were measured before and after the oven-drying process at 80° C. for 6 hours. The average warping (deformation) amount was 0.1 mm and the dimension change was 0.02%. In addition, a wear-resistance testing was performed according to the test method defined in ASTM D4060-10 ("Standard Test Method for Abrasion Resistance of Organic Coating by Taber Abraser"). After 1500 turns using S42 sandpaper, the weight loss was 169 mg.

Example 4

30 kg of polypropylene, 68 kg of calcium carbonate, and 2 kg of calcium stearate were blended to form a bottom material layer with a thickness of 1.2 mm. 20 kg of polypropylene, 78 kg of calcium carbonate, and 2 kg of calcium stearate were blended to form a middle material layer with a thickness of 1.3 mm. A polypropylene (PP) layer made by South Asia Plastics Industry Co., Ltd with a thickness of 0.07 mm was used as a printing layer. 90 kg of polypropylene, 9.5 kg of polyolefin plastomer Exact 9182 (ExxonMobil), and 0.5 kg of antioxidant Tinuvin 326 (Ciba) were blended to form a transparent abrasion-resistant layer with a thickness of 0.5 mm. The aforementioned bottom material layer, middle material layer, printing layer, and transparent abrasion-resistant layer were sequentially stacked together from bottom to top, and then a hot pressing process was performed at 140° C. and 70 kg/cm$^2$ for 35 minutes. The middle material and the printing layer formed a middle layer. After molding, it was cut into a square with a side length of 9.5 inches and was oven-dried at 80° C. for 6 hours.

The four right angles were measured before and after the oven-drying process at 80° C. for 6 hours. The average warping (deformation) amount was 0.1 mm and the dimension change was 0.02%. In addition, a wear-resistance testing was performed according to the test method defined in ASTM D4060-10 ("Standard Test Method for Abrasion Resistance of Organic Coating by Taber Abraser"). After 1500 turns using S42 sandpaper, the weight loss was 169 mg.

Example 5

25 kg of polypropylene, 73 kg of calcium carbonate, and 2 kg of calcium stearate were blended to form a bottom material layer with a thickness of 1.2 mm. 20 kg of polypropylene, 78 kg of calcium carbonate, and 2 kg of calcium stearate were blended to form a middle material layer with a thickness of 1.3 mm. 90 kg of polypropylene, 9.5 kg of polyolefin elastomer Tafmer PN2070 (MITSUI), and 0.5 kg of antioxidant Tinuvin 326 (Ciba) were blended to form a transparent abrasion-resistant layer with a thickness of 0.5 mm. The aforementioned bottom material layer, middle material layer, and transparent abrasion-resistant layer were sequentially stacked together from bottom to top, and then a hot pressing process was performed at 140° C. and 70 kg/cm$^2$ for 35 minutes. After molding, it was cut into a square with a side length of 9.5 inches and was oven-dried at 80° C. for 6 hours.

The four right angles were measured before and after the oven-drying process at 80° C. for 6 hours. The average warping (deformation) amount was 0.5 mm and the dimension change was 0.02%. In addition, a wear-resistance testing was performed according to the test method defined in ASTM D4060-10 ("Standard Test Method for Abrasion Resistance of Organic Coating by Taber Abraser"). After 1500 turns using S42 sandpaper, the weight loss was 196 mg.

It can be seen in the results of Examples 1~5 that the non-polyvinylchloride surface covering provided by the present invention has a small average warping (deformation) amount, a small dimension change, and a good abrasion resistance.

Comparative Example 1

30 kg of polypropylene, 68 kg of calcium carbonate, and 2 kg of calcium stearate were blended to form a bottom material layer with a thickness of 1.2 mm. 20 kg of polypropylene, 78 kg of calcium carbonate, and 2 kg of calcium stearate were blended to form a middle material layer with a thickness of 1.3 mm. A polypropylene (PP) layer made by South Asia Plastics Industry Co., Ltd with a thickness of 0.07 mm was used as a printing layer. 99.5 kg of polypropylene and 0.5 kg of antioxidant Tinuvin 326 (Ciba) were blended to form a transparent abrasion-resistant layer with a thickness of 0.5 mm. The aforementioned bottom material layer, middle material layer, printing layer, and transparent abrasion-resistant layer were sequentially stacked together from bottom to top, and then a hot pressing process was performed at 140° C. and 70 kg/cm² for 35 minutes. The middle material and the printing layer formed a middle layer. After molding, it was cut into a square with a side length of 9.5 inches and was oven-dried at 80° C. for 6 hours.

The four right angles were measured before and after the oven-drying process at 80° C. for 6 hours. The average warping (deformation) amount was 1.3 mm and the dimension change was 0.08%. In addition, a wear-resistance testing was performed according to the test method defined in ASTM D4060-10 ("Standard Test Method for Abrasion Resistance of Organic Coating by Taber Abraser"). After 1500 turns using S42 sandpaper, the weight loss was 243 mg.

Compared to the results of Examples 1~5, it can be learned that when no polyolefin plastomer was added in the transparent abrasion-resistant layer, the surface covering has an increased average warping (deformation) amount, a larger dimension change, and a poorer abrasion resistance.

Comparative Example 2

25 kg of polypropylene, 73 kg of calcium carbonate, and 2 kg of calcium stearate were blended to form a bottom material layer with a thickness of 1.0 mm. 20 kg of polypropylene, 78 kg of calcium carbonate, and 2 kg of calcium stearate were blended to form a middle material layer with a thickness of 1.5 mm. A polypropylene (PP) layer made by South Asia Plastics Industry Co., Ltd with a thickness of 0.07 mm was used as a printing layer. 40 kg of polypropylene, 59.5 kg of polyolefin plastomer Exact 9182 (ExxonMobil), and 0.5 kg of antioxidant Tinuvin 326 (Ciba) were blended to form a transparent abrasion-resistant layer with a thickness of 0.5 mm. The aforementioned bottom material layer, middle material layer, printing layer, and transparent abrasion-resistant layer were sequentially stacked together from bottom to top, and then a hot pressing process was performed at 140° C. and 70 kg/cm² for 35 minutes. The middle material and the printing layer formed a middle layer. After molding, it was cut into a square with a side length of 9.5 inches and was oven-dried at 80° C. for 6 hours.

The four right angles were measured before and after the oven-drying process at 80° C. for 6 hours. The average warping (deformation) amount was 1.0 mm and the dimension change was 0.1%. In addition, a wear-resistance testing was performed according to the test method defined in ASTM D4060-10 ("Standard Test Method for Abrasion Resistance of Organic Coating by Taber Abraser"). After 1500 turns using S42 sandpaper, the weight loss was 720 mg.

Compared to the results of Examples 1~5, it can be learned that when no polyolefin plastomer was added in the transparent abrasion-resistant layer, the surface covering has an increased average warping (deformation) amount, a larger dimension change, and a poorer abrasion resistance.

Comparative Example 3

37 kg of polyvinyl chloride (PVC), 51 kg of calcium carbonate, 11 kg of plasticizer dioctyl terephthalate (DOTP), and 1 kg of calcium stearate were blended to form a bottom material layer with a thickness of 1.2 mm. 19 kg of PVC, 73 kg of calcium carbonate, 7 kg of plasticizer DOTP, and 1 kg of calcium stearate were blended to form a middle material layer with a thickness of 1.3 mm. A polyvinyl chloride (PVC) layer made by South Asia Plastics Industry Co., Ltd with a thickness of 0.07 mm was used as a printing layer. 72 kg of PVC, 0.5 kg of calcium stearate, and 27.5 kg of plasticizer DOTP were blended to form a transparent abrasion-resistant layer with a thickness of 0.5 mm. The aforementioned bottom material layer, middle material layer, printing layer, and transparent abrasion-resistant layer were sequentially stacked together from bottom to top, and then a hot pressing process was performed at 140° C. and 70 kg/cm² for 35 minutes. The middle material and the printing layer formed a middle layer. After molding, it was cut into a square with a side length of 9.5 inches and was oven-dried at 80° C. for 6 hours.

The four right angles were measured before and after the oven-drying process at 80° C. for 6 hours. The average warping (deformation) amount was 0.6 mm and the dimension change was 0.05%. In addition, a wear-resistance testing was performed according to the test method defined in ASTM D4060-10 ("Standard Test Method for Abrasion Resistance of Organic Coating by Taber Abraser"). After 1500 turns using S42 sandpaper, the weight loss was 664 mg.

Compared to the results of Examples 1~5, it can be learned that when polyvinyl chloride was used as the polyolefin in the transparent abrasion-resistant layer, middle material layer, bottom material layer, the surface covering has an increased average warping (deformation) amount, a larger dimension change, and a poorer abrasion resistance. Therefore, it can be learned that under the same wear-resistance testing condition, the abrasion resistance of the non-polyvinylchloride surface covering provided by the present invention was much better than that of the surface covering made of polyvinylchloride.

To sum up, the present invention uses polyolefin (such as polypropylene) in combination with polyolefin plastomer (POP) or polyolefin elastomer (POE) as the composition of the transparent abrasion-resistant layer to make the transparent abrasion-resistant layer and the bottom material layer have a similar thermal contraction amount, thereby efficiently reducing the deformation amount of warping or arching (the average warping amount is less than 0.6 mm, for example, between 0.1 and 0.3 mm), enhancing the dimensional stability (the dimension change is less than 0.05%, for example, between 0.02 and 0.04%) and the abrasion resistance (a weight loss obtained by the ASTM D4060-10 wear-resistance testing is less than 240 mg). In addition, the present invention uses non-PVC materials to provide an environmentally friendly surface covering. The resulting non-PVC surface covering may be applied to floor coverings, floor decoration materials, or wall decoration materials by adding other functional layers.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A non-polyvinylchloride (non-PVC) surface covering, comprising:
    a bottom material layer;
    a middle layer disposed on the bottom material layer, wherein the middle layer comprises a middle material layer; and a transparent abrasion-resistant layer disposed on the middle layer, wherein the transparent abrasion-resistant layer comprises:

a polyolefin of 40~94.95 wt %;

a polyolefin elastomer (POE) or a polyolefin plastomer (POP) of 5~50 wt %; and a processing agent of 0.05~10 wt %.

2. The non-PVC surface covering as claimed in claim 1, wherein the bottom material layer comprises:

a polyolefin;

an organic or inorganic filler; and a processing agent, wherein the organic or inorganic filler is present in the amount of 65 wt % or more of the weight of the bottom material layer.

3. The non-PVC surface covering as claimed in claim 1, wherein the middle material layer comprises:

a polyolefin;

an organic or inorganic filler; and a. processing agent, wherein the organic or inorganic filler is present in the amount of 75 wt % or more of the weight of the middle material layer.

4. The non-PVC surface covering as claimed in claim 2, wherein the organic filler comprises sugar, starch, or wood flour, and the inorganic filler comprises calcium carbonate, magnesium carbonate, talcum powder, silicon oxide, silicon carbide, glass fiber, titanium dioxide, or alumina.

5. The non-PVC surface covering as claimed in claim 3, wherein the organic filler comprises sugar, starch, or wood flour, and the inorganic filler comprises calcium carbonate, magnesium carbonate, talcum powder, silicon oxide, silicon carbide, glass fiber, titanium dioxide, or alumina.

6. The non-PVC surface covering as claimed in claim 1, wherein the processing agent comprises a dispersant, an antioxidant, an antistatic agent, a coupling agent, an UV absorber, a light stabilizer, a flame retardant, a lubricant, or a nucleating agent.

7. The non-PVC surface covering as claimed in claim 2, wherein the processing agent comprises a dispersant, an antioxidant, an antistatic agent, a coupling agent, an UV absorber, a light stabilizer, a flame retardant, a lubricant, or a nucleating agent.

8. The non-PVC surface covering as claimed in claim 3, wherein the processing agent comprises a dispersant, an antioxidant, an antistatic agent, a coupling agent, an UV absorber, a light stabilizer, a flame retardant, a lubricant, or a nucleating agent.

9. The non-PVC surface covering as claimed in claim 1, wherein the polyolefin is polypropylene.

10. The non-PVC surface covering as claimed in claim 2, wherein the polyolefin in the bottom material layer is polypropylene.

11. The non-PVC surface covering as claimed in claim 3, wherein the polyolefin in the middle material layer is polypropylene.

12. The non-PVC surface covering as claimed in claim 1, wherein the middle layer further comprises a printing layer disposed on the middle material layer.

13. The non-PVC surface covering as claimed in claim 1, wherein each of the polyolefin elastomer (POE) and the polyolefin plastomer (POP) independently comprises a copolymer of at least one polyolefin selected from the group consisting of a copolymer of octene, a copolymer of hexene, a copolymer of butene, a copolymer of propylene, and a copolymer of ethylene.

14. The non-PVC surface covering as claimed in claim 1, further comprising a functional layer disposed at the bottom surface of the bottom material layer, wherein the functional layer comprises a foam layer, a nonwoven layer, an adhesive layer, or a combination thereof.

15. The non-PVC surface covering as claimed in claim 1, further comprising a glass fiber layer disposed between the bottom material layer and the middle layer.

16. The non-PVC surface covering as claimed in claim 1, further comprising a coating layer disposed on the transparent abrasion-resistant layer, wherein the coating layer comprises a scratch resistant coating, a matte coating, a slip-resistant coating, an antibacterial coating, or a combination thereof.

* * * * *